United States Patent [19]

Cosman et al.

[11] 4,119,908

[45] Oct. 10, 1978

[54] METHOD FOR LOCATING BURIED MARKERS WHICH ARE DISPOSED ALONG THE PATH OF AN UNDERGROUND CONDUCTOR

[75] Inventors: Armond D. Cosman, Liberty Hill; Gary H. Knippelmier, Round Rock, both of Tex.

[73] Assignee: A. P. C. Industries, Inc., Austin, Tex.

[21] Appl. No.: 827,277

[22] Filed: Aug. 24, 1977

Related U.S. Application Data

[63] Continuation of Ser. No. 636,071, Nov. 28, 1975, abandoned.

[51] Int. Cl.² .................. G01V 3/08; G01V 33/02
[52] U.S. Cl. ........................................... 324/3; 324/67; 340/686; 340/551
[58] Field of Search ............... 324/3, 6, 41, 67, 52; 340/258 C

[56] References Cited

U.S. PATENT DOCUMENTS

| 2,438,197 | 3/1948 | Wheeler | 324/3 X |
| 3,418,572 | 12/1968 | Humphreys | 324/67 |
| 3,740,742 | 6/1973 | Thompson et al. | 340/258 C X |
| 3,836,842 | 9/1974 | Zimmermann et al. | 324/41 X |

FOREIGN PATENT DOCUMENTS 219,493 4/1957 Australia ................................. 324/67

OTHER PUBLICATIONS

Eggleston, H., Locating Underground Pipes, Journal of the Southern California Meter Assoc., *Instruments,* vol. 24, Issue 1, Jan. 1951, pp. 105–108, 110.
Lougheed et al., Buried Marking of Point Locations, *IEEE Transactions on Instrumentation and Measurement,* vol. IM-22, No. 4, pp. 399–402, Dec. 1973.

*Primary Examiner*—Gerard R. Strecker
*Attorney, Agent, or Firm*—Wofford, Felsman, Fails & Zobal

[57] ABSTRACT

Systems and methods for locating re-access points along an underground conductor wherein tuned passive marker elements are disposed adjacent and alongside the conductor at the re-access points, a transmitted signal is coupled to the conductor to create a field about same such that a receiver that is swung to and fro laterally of the conductor by an operator traversing same will normally have a peak-null-peak output, but as a marker is approached the receiver will have a peak output in the normally null region due to a field generated by the passive marker element, thus permitting the location of the passive marker element to be precisely determined.

6 Claims, 5 Drawing Figures

METHOD FOR LOCATING BURIED MARKERS WHICH ARE DISPOSED ALONG THE PATH OF AN UNDERGROUND CONDUCTOR

This is a continuation of application Ser. No. 636,071, filed Nov. 28, 1975, now abandoned.

FIELD OF THE INVENTION

The invention relates to systems and methods for location of buried markers which are disposed along the path of an underground conductor and more particularly wherein the buried markers have been placed at selected locations along a buried utility so that selected locations can be relocated at will for re-access purposes.

BACKGROUND OF THE INVENTION

It often becomes desirable to locate (find) an object that has been previously buried. Of particular interest in this regard are portions of buried utilities such as telephone, electric power, water, gas and the like. For example, in the case of buried telephone cables it is routinely necessary to obtain re-access to such buried objects as splice points, cable stubs, pull boxes, repair sleeves, branches or laterals, etc.. Re-access presupposes location or finding of the buried object; and the degree of effort (expense) required for re-access is directly related to the effectiveness and accuracy of the apparatus and system utilized for the locating task.

Apparatus and systems for locating buried objects in accordance with the prior art of which we are aware have been deficient in both effectiveness and accuracy. Known prior art includes use of a metal ring as a passive marker element and a metal detector as the active apparatus. Such apparatus is unable to distinguish the metal ring from any other metal object with the same field disturbance. Known prior art also includes use of magnets as the passive marker element and a magnetometer as the active apparatus. Magnets which are strong enough to be detectable without false reading due to changes in the earth's magnetic field are expensive and have a relatively short life (2–5 years). Neither of these prior art arrangements is capable of producing a reliable positive indication of only the object in question (passive marker element). In addition, neither of these prior art arrangements is capable of pin-pointing the location of the passive marker element with an optimum degree of accuracy.

In our co-pending continuation application Ser. No. 523,263, filed Nov. 13, 1974, there is disclosed a system utilizing a buried marker device in the form of a passive element which is an inductor-capacitor combination tuned to a predetermined frequency. The marker device is energized by pulses of electromagnetic wave energy from a transmitter having the predetermined frequency and then itself transmits energy to a receiver during the intervals between the pulses. The transmitter-receiver is carried by an operator and contains sensory indicia responsive to received energy and the location of a receiver antenna loop relative to the passive element.

In this application, we disclose systems and methods for locating buried markers which approach the results of the invention of our co-pending application as to sensitivity, accuracy and effectiveness, but which are particularly advantageous from the standpoint of simplicity and economy, as will be apparent from the following description taken in accordance with accompanying drawings, forming a part of this application.

DESCRIPTION OF THE PREFERRED EMBODIMENT

Figure 1:
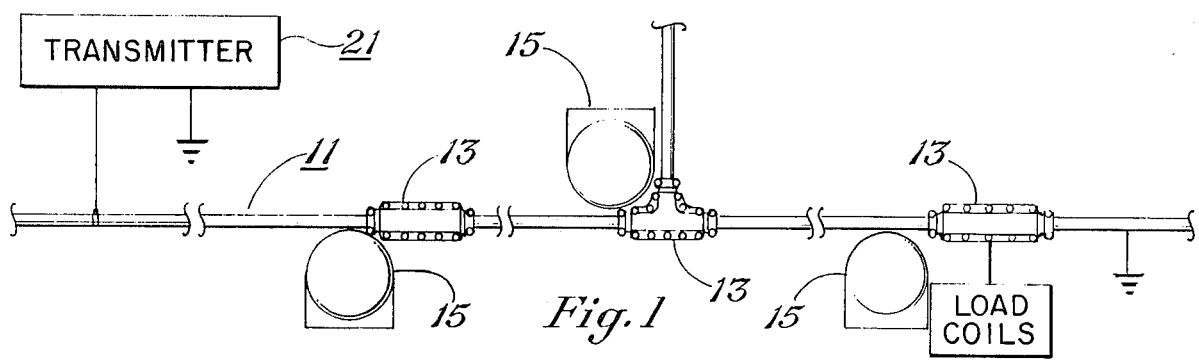
FIG. 1 is a schematic diagram showing a typical installation of buried markers in a utility system wherein the present invention may be used and showing a transmitter coupled to the underground conductor of the utility system.
Figure 2:
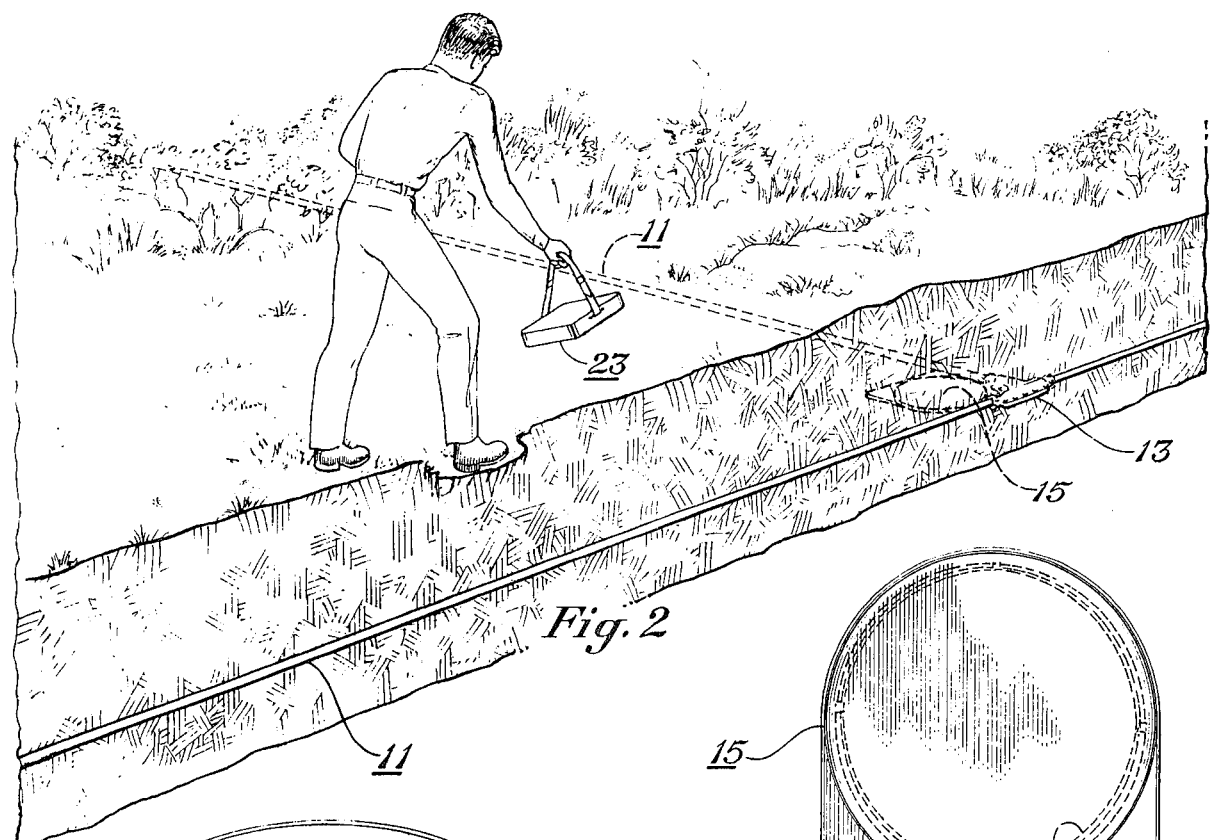
FIG. 2 shows an operator using receiver apparatus to locate a buried marker in a system such as that shown by FIG. 1.
Figure 3:
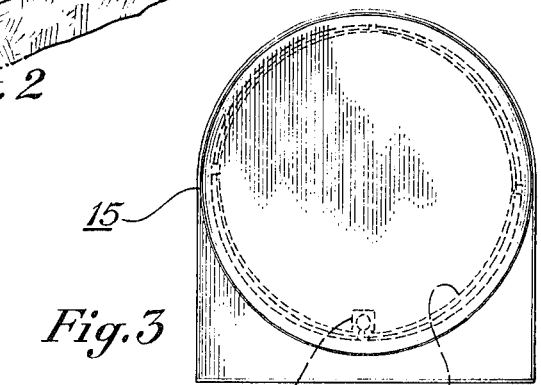
FIG. 3 is a plan view of a typical passive marker element that is utilized in accordance with a preferred embodiment of the invention.
Figure 4:
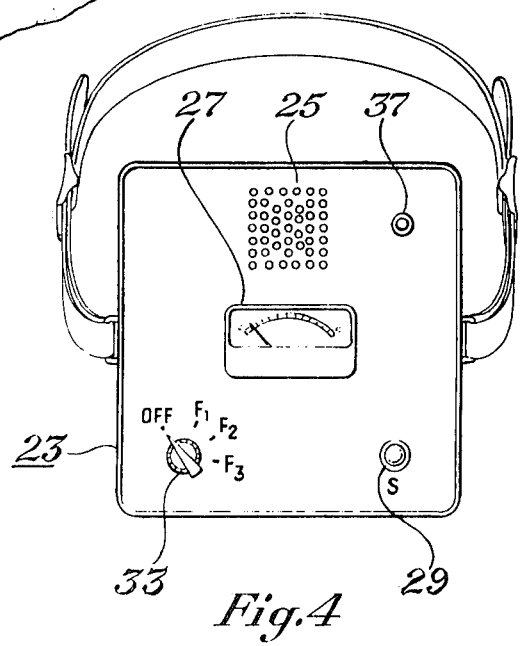
FIG. 4 is a schematic plan view showing the control panel portion of the receiver of FIG. 2.
Figure 5:
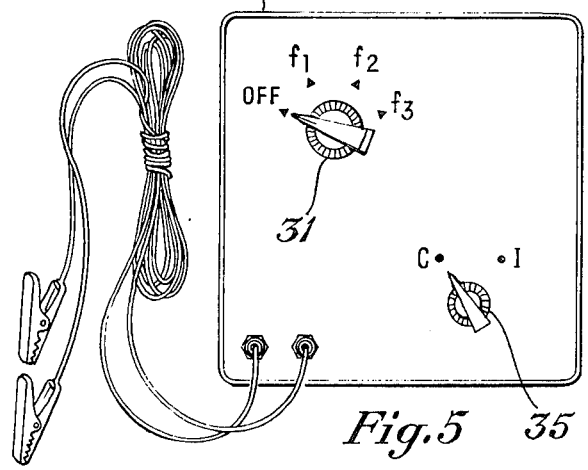
FIG. 5 is a plan view of the control panel of the transmitter of FIG. 1.

For a description of a preferred embodiment of the invention, reference is made to FIGS. 1–5 of the drawings. In FIG. 1 there is shown a typical utility installation such as a telephone cable 11 which has been buried and which has various items such as splice points, cable stubs, pull boxes, junctions, and the like 13 located at random intervals along the cable path. A passive marker element 15 has been buried at the location of each item 13 to which re-access is desired.

Each passive marker element 15 is an inductor-capacitor combination tuned to be resonant at a predetermined frequency, as for example, 100 kHz and is carried within a suitable case. The inductor portion is a coil 17 of wire of ring shaped configuration which typically may have 28 turns (see FIG. 3). The wire size may typically be 26 gage and the coil diameter may typically be one foot. The capacitor portion 19 is, of course, connected in series with the inductor.

Each passive marker element 15 is disposed to lie in a substantially horizontal plane alongside and as close to the cable 11 as is conveniently possible.

The transmitter 21 may be of a conventional type capable of generating the requisite output frequency. The transmitter is preferably conductively coupled to the cable 11, as shown.

The receiver 23 may be of a conventional type having an antenna loop and designed to receive with requisite sensitivity a signal of the transmitted frequency. The receiver 23 is preferably in a form that can be conveniently swung back and forth laterally by the operator as he walks along the cable path, with the antenna loop being generally horizontally disposed.

In operation, the transmitter is connected to the cable at a suitable access point, is turned on, and left, while the operator proceeds to walk along the cable path, swinging the receiver laterally as he goes (the receiver, of course, having been turned on and the sensitivity appropriately adjusted). The transmitter output generates an inductive field in the cable 11 which extends concentrically along the cable with the cable being the field central axis. The conductors of each passive marker element 15 will be cut by the cable conductive field, thus causing a field also to be generated by each passive marker element. The field generated by the respective passive marker element will have the same frequency as that of the cable inductive field but will have a different orientation.

If the operator swings the receiver 23 laterally of the cable 11, and an equal distance on either side thereof, the signal seen by the receiver 23 peaks at the extremes of the swing and nulls at the mean or center of the swing. These peaks and nulls are communicated to the operator either by an audible tone via the speaker 25 or visually via the meter 27. In this manner, the operator can readily follow the cable path. When a passive marker element is encountered, the pattern of the field signal as seen by the receiver 23 is altered such that a signal now appears where there would otherwise be a null. By increasing the receiver sensitivity (by manipulation of sensitivity control knob 29) and by observing the peak on the meter 27 when the receiver 23 is centered over the cable 11, the particular passive marker element 15 can be precisely located.

If desired, a particular frequency can be assigned to passive marker elements that are associated with a particular type of underground device. For example, in a telephone utility installation, a first frequency could be assigned to passive marker elements which are to be associated with splice points, a second frequency assigned to passive marker elements which are to be associated with lateral junctions, and a third frequency assigned to passive marker elements which are to be associated with load coil points. Then the frequency selector knob 31 of the transmitter 21 would be switched to the frequency corresponding to the frequency assigned to the passive marker elements associated with the particular type device to be located. Also, the frequency selector knob 33 of the receiver 23 would be switched to the frequency being transmitted. When plural frequencies are used, the first frequency could typically be 100 kHz, the second frequency 120 kHz and the third frequency 140 kHz.

The transmitter 21 is preferably conductively coupled to the underground conductor 11 so as to achieve a high field energy level. However, in some instances there may not be convenient physical access to the underground conductor, in which case the transmitter may be inductively coupled. A selector control 35 on the transmitter 21 may be provided to accommodate either mode of operation.

If desired, the operator may use a head phone which can be plugged into a jack 37 on receiver 23.

Where plural frequencies are used, the transmitter could be made to transmit the plural frequencies simultaneously, in which case the receiver could be made so as to receive only a selected one of said plural frequencies. This arrangement would make both the transmitter and the receiver more complex.

The underground conductor 11 is most commonly a telephone cable, but it could be any utility where there is a conductive member extending along a route underground. For example, it could be a gas line or a water line or an electric energy power line.

Having described the invention in connection with certain embodiments thereof, it is understood that further modifications may suggest themselves to those skilled in the art and it is intended to cover such modifications as fall within the scope of the appended claims.

What is claimed is:

1. A method for determining locations along the path of an underground conductor where reaccess is desired, comprising:
    a. positioning each of a plurality of passive marker elements at a respective location along said underground conductor where reaccess is desired, each of said elements being an inductor-capacitor combination tuned to be resonant to a selected frequency and being disposed at a respective location adjacent and alongside said underground conductor with its central axis generally vertical;
    b. coupling a transmitter capable of generating an output signal having said selected frequency to said underground conductor;
    c. moving a receiver, having an antenna loop and capable of receiving said selected frequency and communicating to an operator the strength of the received signal, along the underground conductor and swinging the receiver laterally of same to obtain a peak-null-peak signal as an indication that the operator is on the conductor path, and determining the approach of a passive marker element by reception of a signal in the region where there would otherwise be a null.

2. The method of claim 1 wherein said transmitter output signal is conductively coupled to said underground conductor.

3. The method of claim 1 wherein said transmitter output is inductively coupled to said underground conductor.

4. The method of claim 1 wherein groups of passive marker elements are each tuned to a different respective frequency and a transmitter output frequency can be selected corresponding to any selected passive marker element group and the receiver is provided with a receiving channel for the frequency of each passive marker element group.

5. The method of claim 1 wherein the inductor of said passive element is a coil having a ring-like configuration and an air core, so that the passive element is physically stable in the position where the plane of the coil is horizontal and the central axis of the coil is vertical.

6. The method of claim 1 wherein the receiver is provided both audio and visual output signal perception means and sensitivity adjusting means.

* * * * *